US007705249B2

(12) United States Patent
Rindermann et al.

(10) Patent No.: US 7,705,249 B2
(45) Date of Patent: Apr. 27, 2010

(54) ELECTRONIC SCALES CONFIGURED TO DETERMINE A PROFILE AND PERFORM A WEIGHING OPERATION, AND ASSOCIATED METHOD

(75) Inventors: Rainer Rindermann, Goettingen (DE); Jan Von Steuben, Goettingen (DE); Thomas Pertsch, Goettingen (DE); Apolonija Kordes, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 12/210,951

(22) Filed: Sep. 15, 2008

(65) Prior Publication Data

US 2009/0071729 A1 Mar. 19, 2009

Related U.S. Application Data

(63) Continuation of application No. PCT/EP2007/002048, filed on Mar. 9, 2007.

(30) Foreign Application Priority Data

| Mar. 15, 2006 | (DE) | ........................ 10 2006 011 791 |
| Mar. 15, 2006 | (DE) | .................... 20 2006 019 840 U |
| Feb. 9, 2007 | (DE) | ........................ 10 2007 007 163 |

(51) Int. Cl.
*G01G 19/413* (2006.01)
*G01G 23/18* (2006.01)

(52) U.S. Cl. ...................... 177/25.13; 700/84; 705/416; 708/167

(58) Field of Classification Search ... 177/25.11–25.13; 700/84; 705/416; 708/167
See application file for complete search history.

(56) References Cited

U.S. PATENT DOCUMENTS

| 4,862,401 | A | * | 8/1989 | Kubli et al. ................. 708/167 |
| 5,600,781 | A | * | 2/1997 | Root et al. ................... 715/745 |
| 5,841,076 | A | * | 11/1998 | Schwartz et al. ......... 177/25.13 |
| 6,246,018 | B1 | * | 6/2001 | Schink ....................... 177/180 |
| 6,844,506 | B2 | * | 1/2005 | Nuesch et al. ........... 177/25.11 |

(Continued)

FOREIGN PATENT DOCUMENTS

DE 91 07 757 U1 9/1991

(Continued)

*Primary Examiner*—Randy W Gibson
(74) *Attorney, Agent, or Firm*—Sughrue Mion, PLLC

(57) ABSTRACT

Electronic scales having an integrated computer including a display for presenting information to a user, an input unit for entering selection data by a user, a memory for storing a plurality of activatable profiles as sets of parameter values for assignment to corresponding sets of parameters, and a data processing unit for controlling the display, the input unit, and the memory, and for determining and processing measured values in accordance with the current activated profile. The measured values are generated during a weighing operation by the user. To determine a profile, a user is requested, over a plurality of successive steps, to select one of several options presented by the display, the combination of the options presented in a step being dependent on the selection made in the preceding step. Then, during the weighing operation, the user is requested, again, over a plurality of successive steps, to perform an action presented by the display. A request, is a function of the type of actual current activated profile, and is made only if the action requested in the preceding step is confirmed as carried out.

16 Claims, 1 Drawing Sheet

U.S. PATENT DOCUMENTS

| | | | |
|---|---|---|---|
| 7,379,537 B2 * | 5/2008 | Bushey et al. | 379/88.01 |
| 2003/0141116 A1 | 7/2003 | Nuesch et al. | |
| 2009/0008156 A1 * | 1/2009 | Rindermann et al. | 177/25.13 |
| 2009/0071729 A1 * | 3/2009 | Rindermann et al. | 177/25.13 |

FOREIGN PATENT DOCUMENTS

| | | |
|---|---|---|
| DE | 100 40 744 A1 | 2/2002 |
| WO | 02/14809 A | 2/2002 |

* cited by examiner

ELECTRONIC SCALES CONFIGURED TO DETERMINE A PROFILE AND PERFORM A WEIGHING OPERATION, AND ASSOCIATED METHOD

CROSS-REFERENCE TO RELATED APPLICATIONS

This is a Continuation of International Application PCT/EP2007/002048, with an international filing date of Mar. 9, 2007, which was published under PCT Article 21(2) in German, and the complete disclosure of which, including amendments, is incorporated into this application by reference.

FIELD OF THE INVENTION

The invention relates to electronic scales having an integrated computer, including
a display for presenting information to a user,
an input unit for entering selection data by the user,
a memory for storing a plurality of activatable profiles as sets of parameter values for assignment to corresponding sets of parameters, and
a data processing unit for controlling the display, the input unit, and the memory, and for determining and processing measured values in accordance with the current activated profile, said measured values being generated during performance of a weighing operation by the user. Such electronic scales with an integrated computer are described, e.g., in WO2007/104466, which is hereby incorporated into the present application by reference.

The invention further relates to a method for operating such electronic scales.

BACKGROUND INFORMATION

Generic scales are known in the art, e.g., DE 91 07 751 U1 (which is hereby incorporated into the present application by reference). With modern electronic scales, it has become possible to perform multistep and sometimes very complex weighing operations. Depending on the weighing operation to be carried out, a plurality of different parameters must be set for the scales; i.e., specific parameter values must be assigned for the scales. Additional parameter settings may be necessary, depending on the installation site of the scales, the user personnel, or similar criteria. To avoid errors in the setting of parameters and to reduce the time required for setting these parameters, it is known to store, in a memory for the scales, sets of parameter values in the form of so-called profiles, and to activate the applicable profile depending on the application. Upon activation of a profile, the parameter values stored in the profile are assigned to the corresponding scale parameters; i.e., the scales are set according to the profile. Each profile is assigned an identifier by means of which it may be identified, and retrieved and activated without expending a great deal of time. The retrievability of a specific profile may, if necessary, be made dependent on an authorization check of the retrieving user.

After a profile is retrieved, the user is able to carry out a weighing operation. It is necessary for the user to adhere as closely as possible to a specified protocol whose steps are performed in succession. Such protocols may be the result of extensive tests for determining the optimal process flow, or may result from regulatory or other standards. The steps to be performed are routinely compiled in a handbook associated with the scales, which may be consulted by the user.

Despite the great simplification provided by generic scales due to the definition of profiles and the resulting reproducibility of the scale settings, the results that can be achieved using the known system are highly dependent on the attention, diligence and technical qualifications of the user. Inattentiveness or misunderstanding by the user in setting the profiles and performing the scale protocol have a particular influence on the quality of the results. In many cases, however, such dependency on the user personnel or their momentary frame of mind is not acceptable. At the same time, there is a greater risk of faulty operation due to the ever-increasing complexity of instrumentation and protocols. In practice, in the interests of operating safety full use is often not made of the possibilities of modern scales, and highly complex instruments are generally used in only a very basic mode.

OBJECT OF THE INVENTION

An object of the present invention is to refine generic scales and/or their operation in such a way that the quality of the measuring results is less dependent on the user.

SUMMARY OF THE INVENTION

To determine a profile, a user is requested in a plurality of successive steps to select one of several options presented by the display, the combination of the options presented in a step being dependent on the selection made in the preceding step. During the weighing operation, the user is requested, again in a plurality of successive steps, to perform an action presented by the display. A request, depending on its type, is a function of the current activated profile, and is made only if the action requested in the preceding step is confirmed as carried out.

One underlying concept of the present invention is to find a balanced compromise between the following two objectives: firstly, to limit, at least to a reasonable extent, the discretionary freedom of the user, in order to reliably avoid errors; and secondly, to allow the discretionary freedom necessary for utilizing all of the possibilities offered by the scales. To this end, the invention applies two interrelated aspects. The first aspect is the determination of a profile, and the second is the actual performance of a weighing operation on the basis of the profile which is set.

The profile setting is derived from the concept of redundancy control. When a profile is entered, the user is first presented with a plurality of options and is requested to make a selection. In the first step of the profile determination, the selectable options could, for example, relate to the basic type of weighing operation desired. As a rule, different weighing operations require not only different parameter values, but frequently also require parameters which themselves are different. This means that certain parameters are important for some weighing operations but are totally irrelevant for other weighing operations. Querying for such irrelevant parameters is not required, and in fact would only unnecessarily burden the user's patience and attention. In the particular profile to be determined, the corresponding parameter values may remain undefined or may automatically be provided with suitable default values. On the other hand, there are also parameters which are not only relevant for certain weighing operations, but also for which only specific, unique values are meaningful in conjunction with this weighing operation. It is also not necessary to separately query for such parameters; instead, the system may automatically store the corresponding parameter values in the profile to be determined.

According to this principle, all subject areas necessary for the complete setting of the scales may be processed in succession, with multiple selection options being offered to the user. Each specific selection results in the setting of one or more parameter values in the profile to be determined. At the same time it is established that parameter values which have already been set are no longer subject to selection by the user. When one skilled in the art makes a meaningful selection in consideration of the query hierarchy to be created in an individual case, the number of question/response steps to be carried out by the user may be minimized and faulty programming of the profile may be prevented. This is very important in particular for profile creation, which generally occurs only rarely and is usually not subjected to subsequent checking. Thus, an erroneous profile has a continuing adverse effect on the operation of the scales.

The second aspect noted above is the profile-dependent execution of the weighing operations. Specifically, the individual steps of a weighing protocol are stored as a profile or portion of a profile in the memory device for the scales, and the respective next execution step is displayed to the user, preferably in the form of text. To ensure that such a request for carrying out a step is not simply ignored by the user, the next step to be executed is not displayed until the preceding step is confirmed as carried out. Such confirmation may be provided in various ways. For example, the user may perform the confirmation manually by manual entry, such as by pressing a confirmation button. If possible, however, it is preferred that the confirmation be performed automatically. This is achieved by the data processing unit detecting a confirmatory measured value from a sensor which is able to detect that execution of the current step has been completed. For example, the user may be requested to close a wind screen, which may be monitored by a corresponding microswitch and relayed to the data processing unit. Another example would be a request to wait for a given period of time, which may be checked by a time sensor and which requires no separate confirmation by the user. Recording of the confirmation in the control unit may advantageously be indicated to the user optically and/or acoustically.

As a result of the combination of these features, in practice it is possible for the first time to make optimal use of all possibilities offered by modern scales. Thus, a plurality of profiles optimized for the individual case and which are able to affect the specific execution of measurement protocols may be easily stored. However, it is not necessary to separately store, in a handbook for example, a large number of measurement protocols which possibly differ only slightly, for example in the duration of waiting periods. Besides the problem of correctly selecting the right measurement protocol in the specific case, this would also entail the difficulty of maintaining reliability of the execution. Rather, the measurement protocols are generated by the data processing unit as specified by the profiles, and the user is faced only with requests for carrying out very specific steps, these requests in each case always relating to individual current steps.

As mentioned, the particular requested action is presented preferably in a text display, wherein the display preferably includes an optical, acoustic, and/or tactile information presentation unit. In the present context the term "display" is to be construed broadly. Thus, the request directed to the user may, for example, comprise text lines displayed on a screen, and/or may be outputted from a voice synthesizer via a speaker. Different display forms are also possible for representing different levels of urgency. Thus, a text display may be followed by a warning tone if the expected confirmation does not occur within a specified time period.

As used in the present context, the concept of "requesting" an action which is performed in steps is likewise to be broadly construed, and does not necessarily mean that subsequent steps are to be concealed from the user until they become current. Instead, on a text display the user may be notified of a number of future steps which are becoming current. The "request" for the action that is current at that moment is made, for example, by visually highlighting a step, by outputting speech of the corresponding text line, or in other ways.

Although the described features make faulty operation practically impossible, to avoid sabotage, for example, it may be beneficial to make the use dependent on a check of an authorization level of the user. This relates primarily to the particularly sensitive area of profile determination. The user's authorization level may be checked, for example, by entry of a user code or by automatic recognition, for example by reading a chip card or transponder information. Due to the particularly sensitive nature of profile determination, it may be advantageous for the authorization level which authorizes determination of a profile to be different from an authorization level which authorizes a user to perform a weighing operation. It is thus possible, for example, to reserve profile determination strictly for highly technically qualified users who must identify themselves, whereas the performance of weighing operations may be delegated to less qualified personnel who do not have to be identified or who may be identified at a lower authorization level, depending on the requirements of the scale operator.

It should be noted that the term "profile" as used in the present context implies no information about the specific structure of such a profile. Thus, for example, a profile may be a parameter value set which contains a value for each scale parameter that is present. However, a profile structure is also possible in which a profile only contains values for a subset of scale parameters, and when a weighing operation is carried out multiple nonoverlapping profiles are activated. For example, task profiles, instrument profiles, and user profiles may be stored separately. Different authorization levels may be necessary for determining or programming different types of profiles. Thus, for example, user profiles containing individual ergonomic parameters may be programmable by measurement personnel themselves, whereas profiles containing the values for process parameters of the weighing operations or values for parameters regarding peripheral devices, etc. are reserved for personnel with a higher authorization level.

BRIEF DESCRIPTION OF THE DRAWING

Further features and advantages of the invention result from the following detailed description and the drawing, which shows the following:

DETAILED DESCRIPTION OF THE PREFERRED EMBODIMENTS (Creating Profiles) FIG. 1 shows a greatly simplified diagram of the structure upon which the scales according to the invention and the method according to the invention are based. By use of a display for scales (not illustrated in FIG. 1), in the creation of a profile P a first question Q1 is asked of the user. This question Q1 may, for example, relate to the weighing operation for which the profile P is to be created. Concurrent with or subsequent to the question Q1, the user is provided with multiple options A1, A2, and A3 for selection. In the representation of the optional responses A1, A2, and A3 the offer may be presented, for example, in the form of text lines on a screen display. The user is able to select one of the responses A1, A2, or A3 for the scales, for example by using one or more input elements such as virtual or real navigation keys, buttons, scroll bars, or the like.

Figure 1:
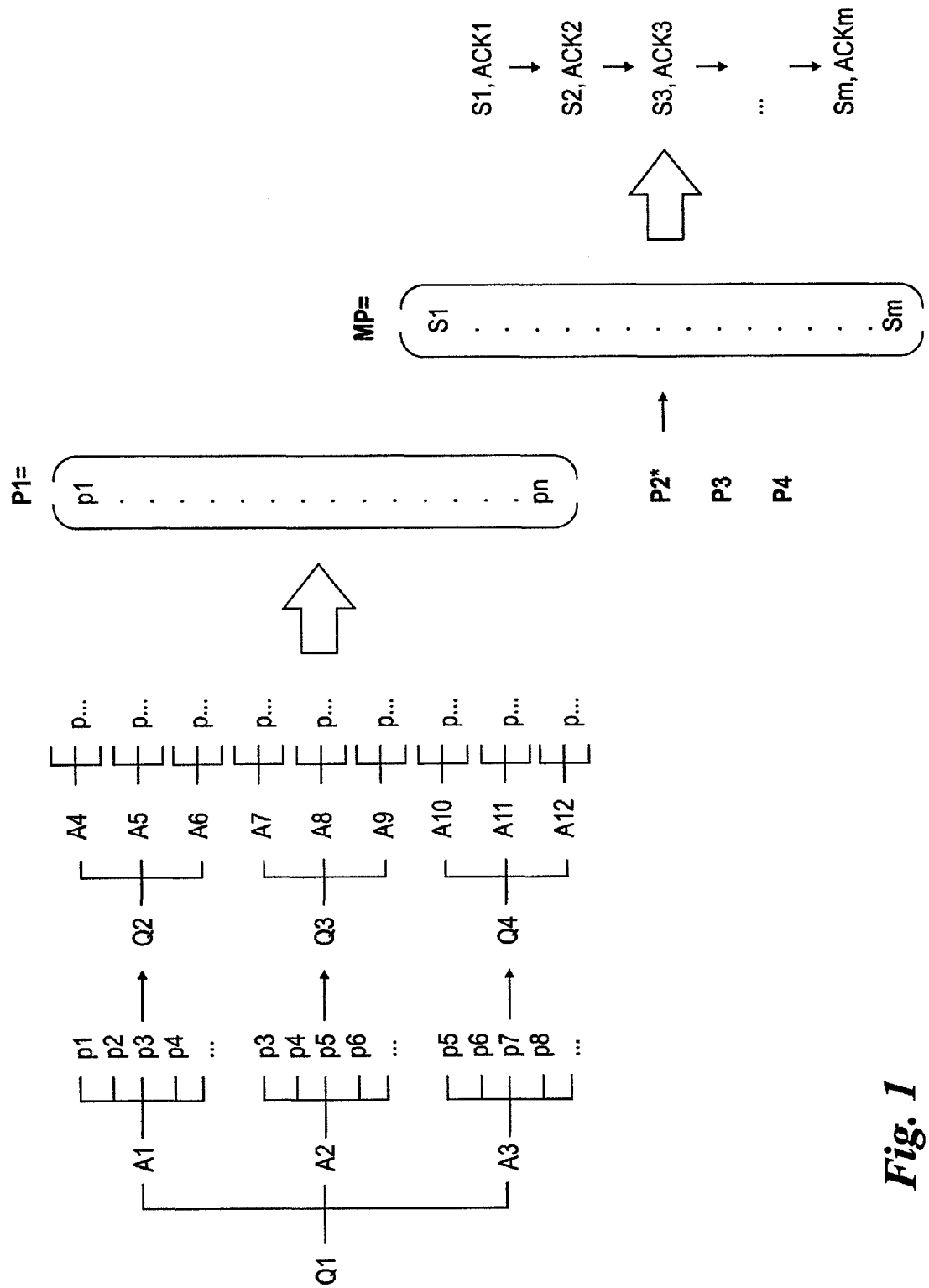
FIG. 1: shows a simplified diagram of the structure according to an embodiment of the invention.

The selection of one of the responses A1, A2, or A3 has two consequences. On the one hand, in the profile P one or more parameter values p are set which result from the selected response. These are parameter values which relate to parameters that are relevant to the intended weighing operation. Parameter values which are reasonably specified or expressly stated by the user are set for such parameters. On the other hand, parameters may also be involved which play no role in the intended weighing operation. Therefore, any default values may be used in the profile P as appropriate parameter values, or the corresponding entry may be left open, for example undefined.

The second consequence of the selection of a response is the automatic determination of a next question to the user. This determination depends on the previously selected response, since this response also sets one or more parameter values p in the profile P. However, as described above, the particular parameter values which must be set or which have already been set depend on the previously selected response.

In the illustrated embodiment, the user is provided with a list of possible responses A1, A2, and A3 to the question Q1. If the response A1 is selected by the user, the parameter values p1, p2, p3, p4, among others, are set; if the response A2 is selected, the parameter values p3, p4, p5, p6, among others, are set; and if the response A3 is selected, the parameter values p5, p6, p7, p8, among others, are set. The illustrated example has been chosen so that the subsets of parameter values which are set as a result of the selected responses partially overlap one another. However, a complete overlap as well as a complete separation are also possible. Depending on the selected response, and, therefore, depending on the parameter values set in the first step, the subsequent questions should preferably be selected in such a way that the parameters which have not yet been set are set as quickly as possible, i.e., in the smallest possible number of question/response steps, and parameters which have already been set cannot be changed. Thus, in the illustrated example the selection of the response A1 is followed by the next question Q2, but the selection of response A2 is followed by the next question Q3, and the selection of the response A3 is followed by the next question Q4. In the example shown, the questions Q2, Q3, or Q4 are each provided with three response options, namely, the response options A4, A5, and A6 for the question Q2, the response options A7, A8, and A9 for the question Q3, and the response options A10, A11, and A12 for the question Q4. The selection of each of these responses A4 through A12 in turn results in the setting of one or more parameters and determination of the next question. For the sake of clarity the diagram illustration is interrupted. However, one skilled in the art may easily extrapolate the continuation.

In summary, this question/response cascade results in a complete parameter value set which may be stored as a profile. In the example shown, a profile P1 results which is stored in addition to the other profiles P2, P3, P4. The other profiles P2, P3, and P4 have been created in a manner analogous to the creation of P1. However, a different response option to a question has been selected at any location, resulting in a profile having different parameter values than for P1.

(Weighing Operation) If the scales are used further by the same or a different user, one of the stored profiles is activated. In FIG. 1 this is the profile P2, represented by the addition of a "*" symbol.

As a result of activating the profile P2, a weighing protocol MP based on the parameter values of the profile P2 is automatically provided for carrying out the weighing operation.

The weighing protocol MP includes a plurality of instruction steps S1 through Sm which are to be successively executed for performing a correct weighing by the user.

For this purpose, each of the steps S1-Sm is presented to the user on a display, and the user is requested to perform the corresponding action. After the requested action is performed its completion is confirmed, as represented by the abbreviation ACK in FIG. 1. This means that the action step S1 is first requested, is carried out by the user, and is confirmed as ACK1. Only then is the user requested to perform the next step S2, which after completion of the requested action is confirmed by ACK2. This alternating process of requesting an action, performing the action, and confirming the action continues until the last step Sm is confirmed by ACKm.

The confirmations ACK1 through ACKm may occur, for example, by actuation of a real or virtual confirmation element by the user and/or automatically on the basis of a sensor detection of the performance of the individual steps. The sensor preferably communicates with the control unit, preferably without involvement of the user.

Of course, the embodiment discussed in the detailed description and illustrated in FIG. 1 represents only one illustrative exemplary embodiment of the present invention. The invention is in no way limited to the number of questions, response options, parameter values, and protocol steps illustrated in the figure. In addition, the structure of the profile need not have the simple form shown in FIG. 1. Instead, the overall scale setting may include a plurality of subprofiles, each of which relates to values for different, nonoverlapping groups of parameters.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. Electronic scales having an integrated computer comprising:
   a display for presenting information to a user,
   an input unit for entering selection data by the user,
   a memory for storing a plurality of activatable profiles as sets of parameter values for assignment to corresponding sets of parameters,
   a data processing unit for controlling the display, the input unit, and the memory, and for determining and processing measured values in accordance with a current activated profile, the measured values being generated during performance of a weighing operation by the user, and
   an algorithm for the data processing unit, in which:
   to determine a profile as the current activated profile, the user is requested in a plurality of successive steps to select one of several options presented by the display, wherein the combination of the options presented in a given one of the steps is dependent on a selection made in a step preceding the given step, and
   to perform the weighing operation, the user is requested in a plurality of successive performance steps to perform respective actions presented by the display, wherein a given one of the requests is a function of the current activated profile, and is made only if an action requested in a preceding one of the performance steps is confirmed as carried out.

2. Scales according to claim 1, wherein the display includes at least one of an optical, acoustic, and tactile information presentation unit.

3. Scales according to claim 2, wherein the requested action is presented on the display as text.

4. Scales according to claim 1, wherein the performance of a given one of the requested actions is confirmed by manual input into the input unit by the user.

5. Scales according to claim 1, wherein the performance of a given one of the requested actions is confirmed automatically by detection of a respective one of the measured values by the data processing unit.

6. Scales according to claim 1, wherein for the determination of a profile, after an option is selected, at least one parameter value, which is derived from the selected option according to specified rules, is automatically set.

7. Scales according to claim 1, wherein the algorithm checks an authorization level of the user before a profile is determined.

8. Scales according to claim 7, wherein the authorization level which authorizes determination of a profile is different from an authorization level which authorizes a user to perform a weighing operation.

9. Method for operating electronic scales having an integrated computer comprising a display for presenting information to a user, an input unit for entering selection data by the user, a memory for storing a plurality of activatable profiles as sets of parameter values for assignment to corresponding sets of parameters, and a data processing unit for controlling the display, the input unit, and the memory, and for determining and processing measured values in accordance with a current activated profile, the measured values being generated during performance of a weighing operation by the user, the method comprising:
  to determine a profile as the current activated profile, requesting the user in a plurality of successive steps to select one of several options presented by the display, wherein the combination of the options presented in a given one of the steps is dependent on a selection made in a step preceding the given step; and
  to perform the weighing operation, requesting the user in a plurality of successive performance steps to perform respective actions presented by the display, wherein a given one of the requests is a function of the current activated profile, and is made only if an action requested in a preceding one of the performance steps is confirmed as carried out.

10. Method according to claim 9, wherein the requested action is presented on the display as text.

11. Method according to claim 9, wherein the performance of a given one of the requested actions is confirmed by manual input into the input unit by the user.

12. Method according to claim 9, wherein the performance of a given one of the requested actions is confirmed automatically by detection of a respective one of the measured values by the data processing unit.

13. Method according to claim 9, wherein, for the determination of a profile, after an option is selected, at least one parameter value, which is derived from the selected option according to specified rules, is automatically set.

14. Method according to claim 9, further comprising checking an authorization level of the user before a profile is determined.

15. Method according to claim 14, wherein the authorization level which authorizes determination of a profile is different from an authorization level which authorizes a user to perform a weighing operation.

16. A method, comprising:
  providing a plurality of respectively unique profiles, each of the profiles provided by:
    presenting a first question having a plurality of first answer options to a user;
    receiving one of the first answer options from the user;
    storing at least one first parameter value in accordance with the first answer;
    selecting a second question in accordance with the first answer, wherein the second question has a plurality of second answer options;
    presenting the second question to the user;
    receiving one of the second answer options from the user; and
    storing at least one second parameter value in accordance with the second answer;
    storing the first and second parameter values as the provided profile; and
  performing a weighing operation in accordance with a selected one of the respectively unique profiles by:
    automatically providing a weighing protocol uniquely associated with the selected profile; wherein the weighing protocol includes a plurality of user steps respectively associated with a plurality of instruction steps;
    presenting a first of the plurality of instruction steps to the user;
    confirming completion by the user of the first user step associated with the first instruction step;
    following the confirmation, presenting a second of the plurality of instruction steps to the user; and
    confirming completion by the user of the second user step associated with the second instruction step.

* * * * *